United States Patent
Xu et al.

(10) Patent No.: US 12,400,787 B2
(45) Date of Patent: Aug. 26, 2025

(54) WATERPROOF TRANSFORMER COIL STRUCTURE AND MANUFACTURING METHOD THEREOF

(71) Applicant: Haihong Electric Co. Ltd., Guangdong (CN)

(72) Inventors: Kaixuan Xu, Guangdong (CN); Qingning Liang, Guangdong (CN); Yixiong Liang, Guandong (CN); Huilin Guan, Guangdong (CN); Fei Li, Guangdong (CN); Danju Song, Guangdong (CN); Wenjie Fang, Guangdong (CN); Yuxiang Qi, Guangdong (CN); Jingyu Tan, Guangdong (CN); Wanhuan Li, Guangdong (CN); Xiuting Yu, Guangdong (CN)

(73) Assignee: HAIHONG ELECTRIC CO., LTD., Guangdong (CN)

( * ) Notice: Subject to any disclaimer, the term of this patent is extended or adjusted under 35 U.S.C. 154(b) by 808 days.

(21) Appl. No.: 17/640,209

(22) PCT Filed: Nov. 10, 2021

(86) PCT No.: PCT/CN2021/129881
§ 371 (c)(1),
(2) Date: Mar. 3, 2022

(87) PCT Pub. No.: WO2022/148125
PCT Pub. Date: Jul. 14, 2022

(65) Prior Publication Data
US 2023/0162909 A1    May 25, 2023

(30) Foreign Application Priority Data
Jan. 7, 2021    (CN) .......................... 202110017709.2

(51) Int. Cl.
H01F 27/30    (2006.01)
H01F 27/32    (2006.01)
H01F 41/04    (2006.01)

(52) U.S. Cl.
CPC ......... H01F 27/306 (2013.01); H01F 27/324 (2013.01); H01F 41/04 (2013.01)

(58) Field of Classification Search
CPC .................................................... H01F 27/306
(Continued)

(56) References Cited

U.S. PATENT DOCUMENTS

| 5,416,373 A | 5/1995 | Maruyama et al. |
| 2007/0279177 A1* | 12/2007 | Sarver .................. H01F 41/063 29/605 |

(Continued)

FOREIGN PATENT DOCUMENTS

| CN | 204117812 | 1/2015 |
| CN | 205248106 | 5/2016 |

(Continued)

OTHER PUBLICATIONS

English translation of CN206022077 (Year: 2017).*
(Continued)

*Primary Examiner* — Ronald Hinson
(74) *Attorney, Agent, or Firm* — Ware, Fressola, Maguire & Barber LLP (57) ABSTRACT

Disclosed are a waterproof transformer coil structure and a manufacturing method thereof. The waterproof transformer coil structure includes: an insulating cylinder configured for supporting a transformer coil; a strut configured for being wound with the transformer coil, where the strut is mounted on the insulating cylinder, and the strut is provided with strip-shaped notches; and a winding wire, where the winding wire is wound on the strip-shaped notches.

6 Claims, 5 Drawing Sheets

(58) Field of Classification Search
USPC .......................................................... 336/208
See application file for complete search history.

(56) References Cited

U.S. PATENT DOCUMENTS

| | | |
|---|---|---|
| 2015/0376672 A1 | 12/2015 | Shin et al. |
| 2016/0027573 A1 | 1/2016 | Xu et al. |
| 2017/0352473 A1 | 12/2017 | Wang |

FOREIGN PATENT DOCUMENTS

| | | |
|---|---|---|
| CN | 206022077 | 3/2017 |
| CN | 108847330 A | 11/2018 |
| CN | 112786293 | 5/2021 |
| CN | 214279765 | 9/2021 |
| DE | 102014116973 A1 | 1/2016 |
| JP | S63188911 A | 8/1988 |
| JP | 2006147927 A | 6/2006 |
| JP | 2011204836 A | 10/2011 |
| JP | 2016032094 A | 3/2016 |
| JP | 6028109 B2 | 11/2016 |
| WO | 2014017213 A1 | 1/2014 |

OTHER PUBLICATIONS

First Office Action for the Chinese family patent CN112786293A on Nov. 29, 2024 with English translation.
First Office Action for the German family patent DE112021000113.2 on Aug. 30, 2024 with English translation.
First Office Action for the Indian family patent No. 202227014369 on Aug. 9, 2024.
First Office Action for the Japanese family patent JP2023520271A on May 16, 2023.
First Search Report for the Chinese family patent CN112786293A on Nov. 28, 2024 with English translation.

\* cited by examiner

WATERPROOF TRANSFORMER COIL STRUCTURE AND MANUFACTURING METHOD THEREOF

CROSS-REFERENCE TO RELATED APPLICATIONS

This application is a national stage filing under 35 U.S.C. § 371 of international application number PCT/CN2021/129881, filed Nov. 10, 2021, which claims priority to Chinese patent application No. 2021100177092 filed Jan. 7, 2021. The contents of these applications are incorporated herein by reference in their entirety.

TECHNICAL FIELD

The disclosure relates to the field of transformers, and more particularly, to a waterproof transformer coil structure and a manufacturing method thereof.

BACKGROUND

In recent years, underground distribution devices may be flooded and burned down due to waterlogging, which leads to interruption of power supply. Once the transformer, as the key component of a distribution device, is burned down, on-site replacement of the transformer is difficult and takes a long time, which will cause long-term power outage, seriously reduce an efficiency of power supply restoration of an urban power grid and cause great inconvenience to people's life and production. Considering aspects such as safety, reliability and fireproofing, dry-type transformer is generally used an underground transformer. Performance of the coil, as a core member of the transformer, directly affects whether the product can be operated normally. However, when the dry-type transformer undergoes waterlogging, the coil, after soaked during waterlogging, will be damp and has a reduced electrical performance or even be burnt-down, thus affecting normal operation of the product. For a traditional waterproof transformer, the coil is casted into a whole by using epoxy casting, which is complicated in process, and has high material and production costs. When the product is operated for a period of time, the coil is prone to a "crazing" phenomenon, which reduces an electrical performance and a waterproof capability of the product.

SUMMARY

The disclosure aims to solve at least one of the technical problems in the existing technology. To this end, the disclosure provides a waterproof transformer coil structure and a manufacturing method thereof. The waterproof transformer coil structure solves problems that a coil is easy to get damp and an electrical performance is lowered after a dry-type transformer is waterlogged, and the manufacturing method is provided, so that technical effects of a simple and reliable operation and improvement of a cost performance of products are achieved.

The disclosure provides a waterproof transformer coil structure with the functions above. The waterproof transformer coil structure includes: an insulating cylinder configured for supporting a transformer coil; a strut configured for being wound with the transformer coil, where the strut is mounted on the insulating cylinder, and the strut is provided with a plurality of strip-shaped notches; and a winding wire, where the winding wire is wound on the strip-shaped notches.

The waterproof transformer coil structure according to the embodiments of the disclosure at least has the following technical effects: the waterproof transformer coil structure improves waterproof and water drainage capabilities of the coil and enhances a waterproof performance of the transformer through the strut and the strip-shaped notches arranged in the strut.

For the waterproof transformer coil structure according to the embodiments of the disclosure, the strut is provided in plural, and the struts are evenly arranged on an outer wall of the insulating cylinder, so that the struts are evenly distributed on the insulating cylinder. The struts can enhance a water drainage capability of the waterproof transformer coil, water can flow out of the coil along the struts without water accumulation, and the even distribution of the struts on the insulating cylinder can enhance a mechanical strength of the insulating cylinder.

For the waterproof transformer coil structure according to the embodiments of the disclosure, the strip-shaped notches are evenly arranged on an outer edge of the strut, so that the strip-shaped notches are evenly disputed on the strut. The even distribution of the strip-shaped notches on the strut can enhance a mechanical strength of the strut, and the winding wire is wound on the strip-shaped notches, so that the even distribution of the strip-shaped notches can maintain an electrical performance of the transformer.

For the waterproof transformer coil structure according to the embodiments of the disclosure, two ends of the strut are respectively provided with a bending notch which is convenient for water drainage. An angle ring is inserted into the bending notch, which can enhance an electrical performance and reduce accumulated water in the coil.

For the waterproof transformer coil structure according to the embodiments of the disclosure, the bending notch includes an inclined portion convenient for water drainage and a vertical portion, and the inclined portion is connected with the vertical portion. The inclined portion is convenient for water drainage, and after the angle ring is inserted into the vertical portion, the electrical performance can be enhanced and the accumulated water in the coil can be reduced.

The waterproof transformer coil structure according to the embodiments of the disclosure further includes an angle ring, where an outer end face of the angle ring is lower than an inner end face of the angle ring, the angle ring is arranged on the bending notch of the strut, and the angle ring is made of silicone rubber material. Arrangement of the outer end face of the angle ring being lower than the inner end face of the angle ring can facilitate outflow of the water, and reduce a probability of water accumulation in the transformer coil.

For the waterproof transformer coil structure according to the embodiments of the disclosure, the winding wire includes a metal wire conductor, a first polyimide film, a first insulating paper, a second insulating paper and a second polyimide film. The metal wire conductor, the first polyimide film, the first insulating paper, the second insulating paper and the second polyimide film are wrapped in sequence, and the winding wire is wound on the strip-shaped notches. Wrapping of the metal wire conductor, the first polyimide film, the first insulating paper, the second insulating paper and the second polyimide film in sequence can enhance insulation of the metal wire conductor, and prevent short circuit caused by water soaking.

The waterproof transformer coil structure according to the embodiments of the disclosure further includes an insulating ring arranged on both end faces of the winding wire, and the insulating ring is made of an insulating material. The insulating rings are used for enhancing an insulating performance of the transformer coil.

A method for manufacturing the waterproof transformer coil according to the embodiments of the disclosure includes: machining an insulating material or an insulating plate into a cylindrical structure to form an insulating cylinder; machining an insulating material into a plurality of struts, and machining a plurality of strip-shaped notches in a middle portion of each of the struts; evenly distributing and fixing the struts on a surface of the insulating cylinder; and winding a winding wire on the strip-shaped notches of the strut to form a pie winding.

The method for manufacturing the waterproof transformer coil according to the embodiments of the disclosure further: inserting an insulating ring on both upper and lower end faces of the pie winding; inserting an angle ring along a bending notch of the strut; performing primary roasting on the waterproof transformer coil; performing primary vacuum immersion paint on the waterproof transformer coil; performing secondary roasting on the waterproof transformer coil; performing secondary vacuum immersion paint on the waterproof transformer coil; performing third roasting on the waterproof transformer coil; and coating hydrophobic paint on a surface of the waterproof transformer coil.

The additional aspects and advantages of the disclosure will be given in part in the following description, and will become apparent in part from the following description, or will be learned through the practice of the disclosure.

BRIEF DESCRIPTION OF THE DRAWINGS

The above and/or additional aspects and advantages of the disclosure will be apparent and easily understood from the description of the embodiments with reference to the following accompanying drawings, wherein.

REFERENCE NUMERALS

101 refers to insulating cylinder,
201 refers to strut, 202 refers to strip-shaped notch, 230 refers to bending notch, 204 refers to inclined portion, 205 refers to vertical portion,
301 refers to winding wire, 302 refers to metal wire conductor, 303 refers to first polyimide film, 304 refers to first insulating paper, 305 refers to second insulating paper, 306 refers to second polyimide film,
401 refers to angle ring, and
501 refers to insulating ring.

DETAILED DESCRIPTION

The embodiments of the disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain the disclosure but should not be construed as a limitation to the disclosure.

In the description of the disclosure, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the description of the disclosure, "several" means one or more, "a plurality of" means more than two, "greater than a number", "less than a number", "exceed a number" and the like indicate that the number is excluded, and "above a number", "below a number", "within a number", and the like indicate that the number is included. "First" and "second" are only used to distinguish between technical features but cannot be used to indicate or imply relative importance or implicitly specify a quantity of indicated technical features or implicitly specify a sequential relationship of indicated technical features.

In the description of the disclosure, unless otherwise expressly defined, the terms such as "disposed", "mounted", and "connected" should be understood in a broad sense. For persons of ordinary skill in the art, specific meanings of the terms in the disclosure may be appropriately determined with reference to the specific content in the technical solution.

Figure 1:
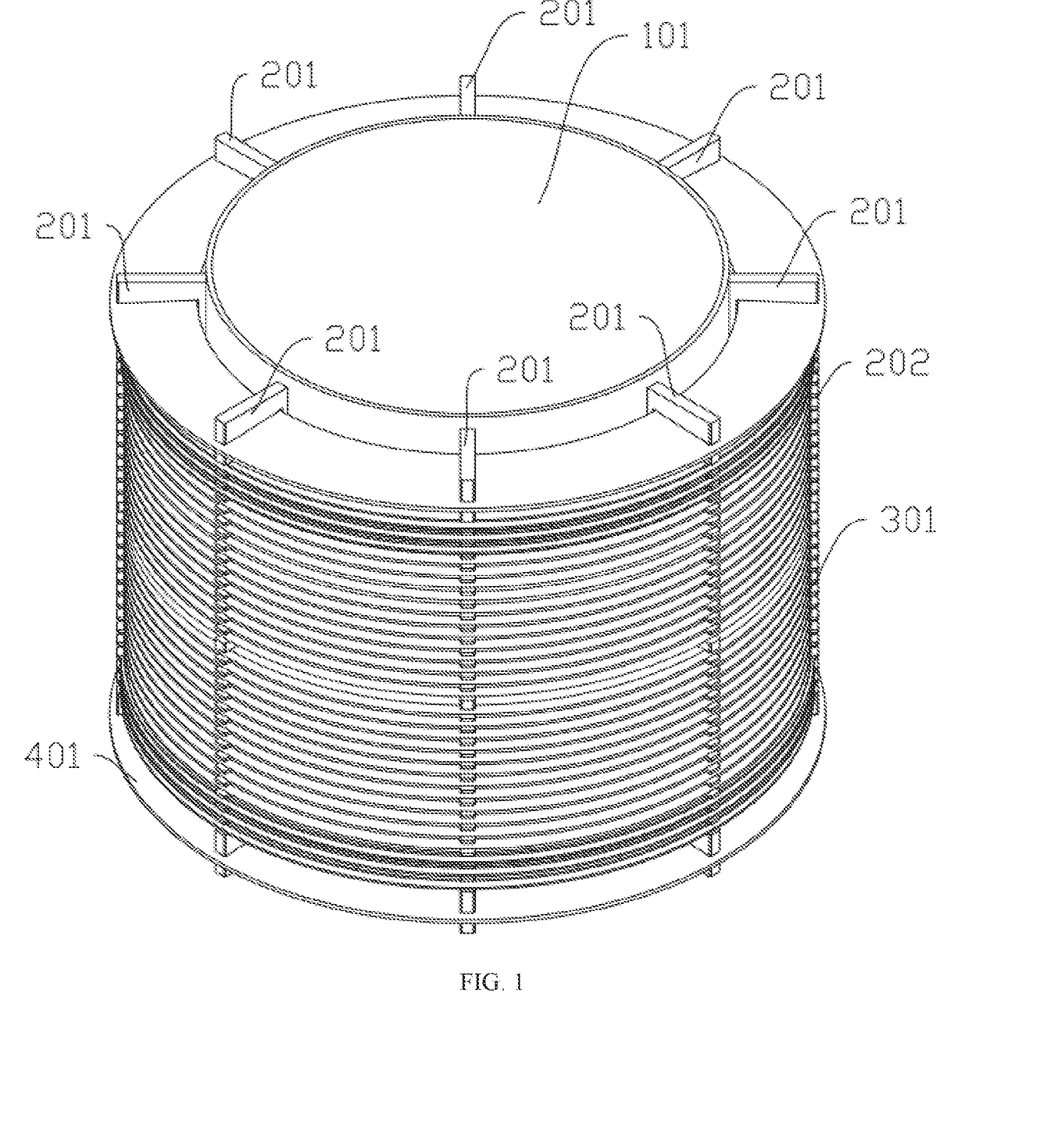
FIG. 1 is a schematic diagram of a waterproof transformer coil structure according to the embodiments of the disclosure.

With reference to FIG. 1, the disclosure provides a waterproof transformer coil structure with the functions described above. The waterproof transformer coil structure includes: an insulating cylinder 101 configured for supporting a transformer coil; a strut 201 configured for being wound with the transformer coil, where the strut 201 is mounted on the insulating cylinder 101, and the strut 201 is provided with strip-shaped notches 202; and a winding wire 301, where the winding wire 301 is wound on the strip-shaped notches 202.

With reference to FIG. 1, the waterproof transformer coil structure according to the embodiments of the disclosure at least has the following technical effects: the waterproof transformer coil structure improves waterproof and water drainage capabilities of the coil and enhances a waterproof performance of the transformer through the strut 201 and the strip-shaped notches 202 arranged in the strut 201.

Figure 2:
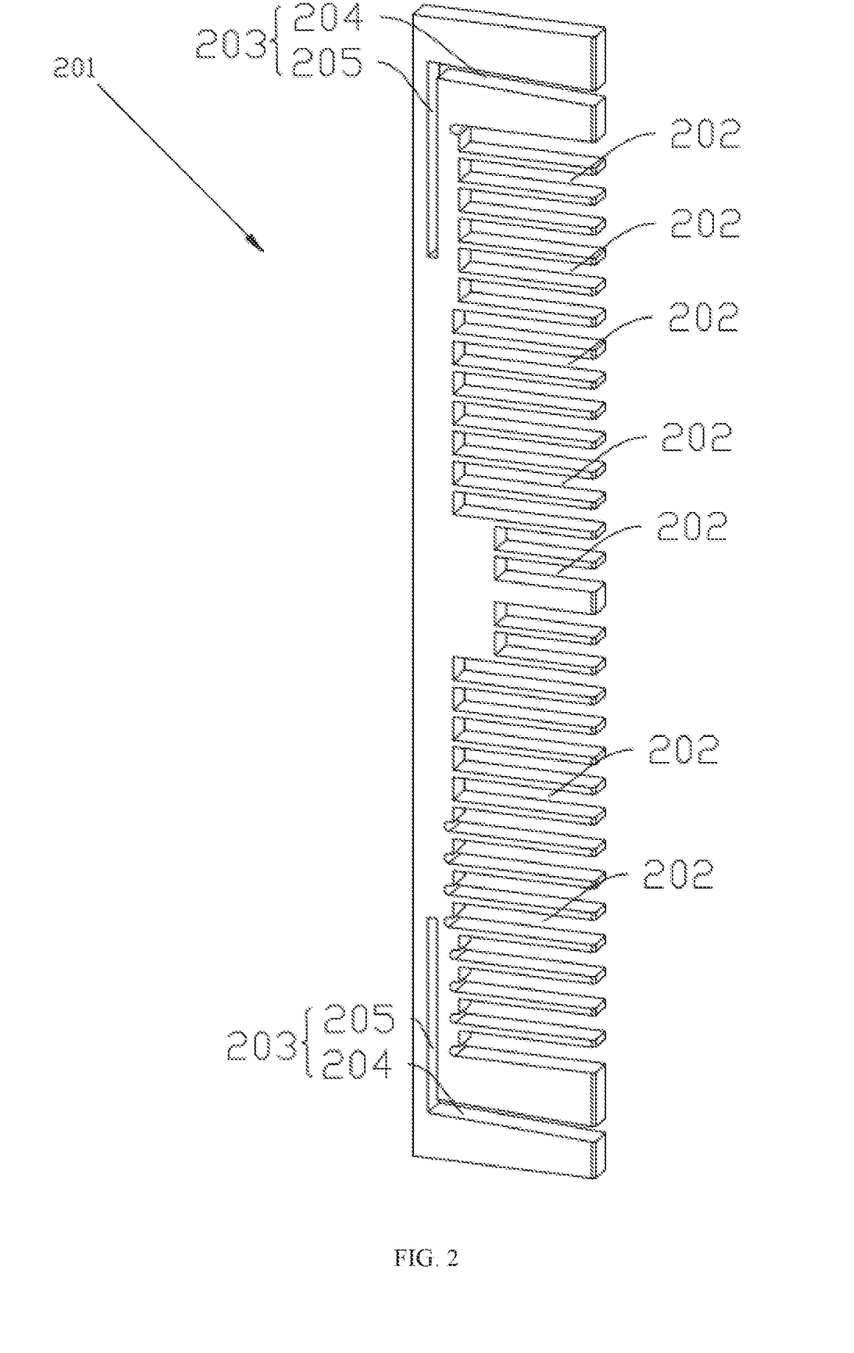
FIG. 2 is a schematic diagram of a strut of the waterproof transformer coil structure according to the embodiments of the disclosure.

With reference to FIG. 2, for the waterproof transformer coil structure according to the embodiments of the disclosure, a plurality of struts 201 are provided, and the struts 201 are evenly arranged on an outer wall of the insulating cylinder 101, so that the struts 201 are evenly distributed on the insulating cylinder 101. The struts 201 can enhance a water drainage capability of the waterproof transformer coil, water can flow out of the coil along the struts 201 without water accumulation, and even distribution of the struts 201 on the insulating cylinder 101 can enhance a mechanical strength of the insulating cylinder 101.

With reference to FIG. 2, for the waterproof transformer coil structure according to the embodiments of the disclosure, the strip-shaped notches 202 are evenly arranged on an outer edge of the strut 201, so that the strip-shaped notches 202 are evenly disputed on the strut 201. The even distribution of the strip-shaped notches 202 on the strut 201 can enhance a mechanical strength of the strut 201, and the winding wire 301 is wound on the strip-shaped notches 202, so that the even distribution of the strip-shaped notches 202 can maintain an electrical performance of the transformer.

With reference to FIG. 2, for the waterproof transformer coil structure according to the embodiments of the disclosure, two ends of the strut 201 are respectively provided with a bending notch 203 which is convenient for water drainage. An angle ring 401 is inserted into the bending notch 203, which can enhance an electrical performance and reduce accumulated water in the coil.

With reference to FIG. 2, for the waterproof transformer coil structure according to the embodiments of the disclosure, the bending notch 203 includes an inclined portion 204 convenient for water drainage and a vertical portion 205, and the inclined portion 204 is connected with the vertical portion 205. The inclined portion 204 is convenient for water drainage, and after the angle ring 401 inserted into the vertical portion 205, the electrical performance can be enhanced and the accumulated water in the coil can be reduced.

Figure 4:
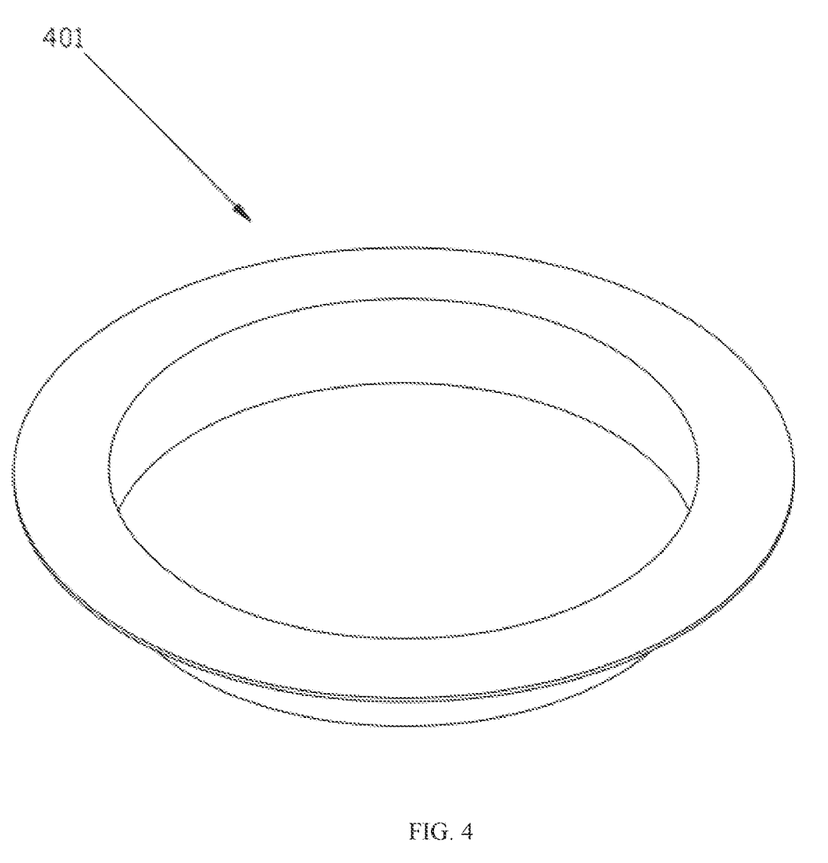
FIG. 4 is a schematic diagram of an angle ring of the waterproof transformer coil structure according to the embodiments of the disclosure.

With reference to FIG. 1 and FIG. 4, the waterproof transformer coil structure according to the embodiments of the disclosure further includes an angle ring 401, where an outer end face of the angle ring 401 is lower than an inner end face of the angle ring 401, the angle ring 401 is arranged in the bending notch 203 of the strut 201, and the angle ring 401 is made of a silicone rubber material. Arrangement of the outer end face of the angle ring 401 being lower than the inner end face of the angle ring 401 can facilitate outflow of the water, and reduce a probability of water accumulation in the transformer coil.

Figure 3:
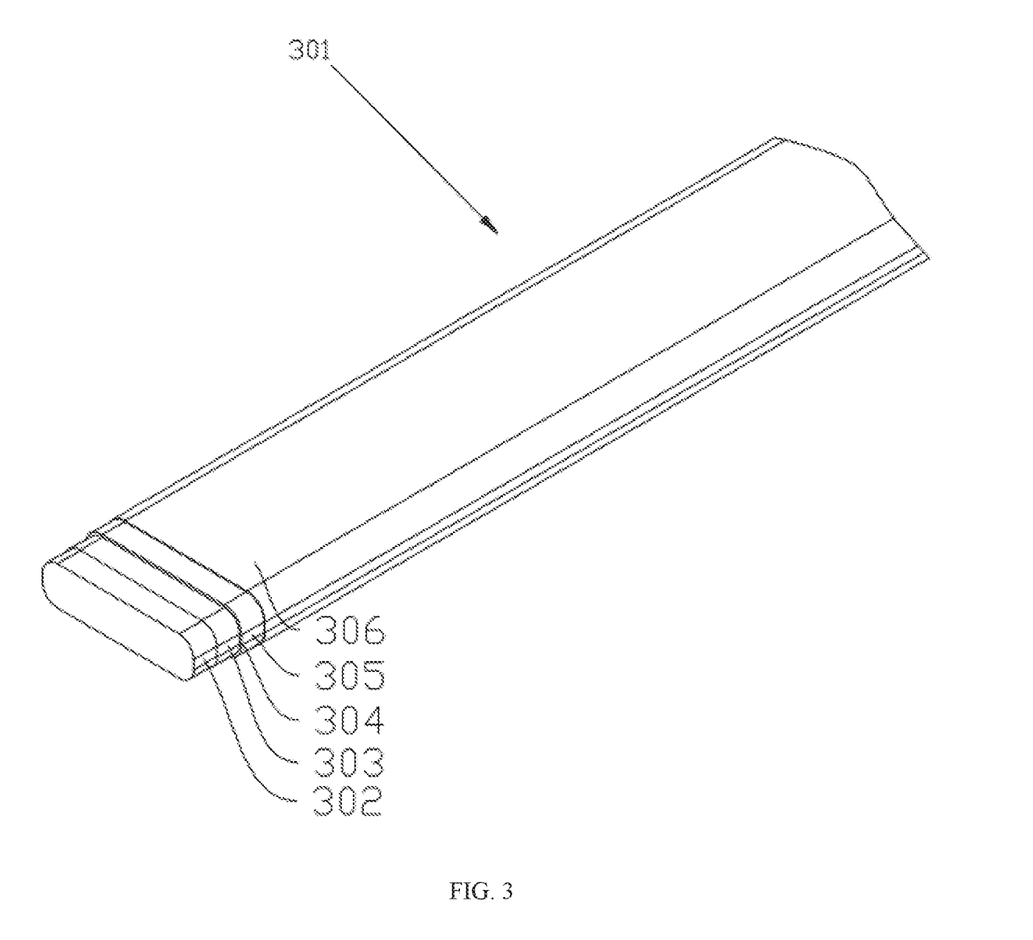
FIG. 3 is a schematic diagram of a winding wire of the waterproof transformer coil structure according to the embodiments of the disclosure.

With reference to FIG. 1 and FIG. 3, for the waterproof transformer coil structure according to the embodiments of the disclosure, the winding wire 301 includes a metal wire conductor 302, a first polyimide film 303, a first insulating paper 304, a second insulating paper 305 and a second polyimide film 306. The metal wire conductor 302, the first polyimide film 303, the first insulating paper 304, the second insulating paper 305 and the second polyimide film 306 are wrapped in sequence, and the winding wire 301 is wound on the strip-shaped notches 202. Wrapping of the metal wire conductor 302, the first polyimide film 303, the first insulating paper 304, the second insulating paper 305 and the second polyimide film 306 in sequence can enhance insulation of the metal wire conductor 302, and prevent short circuit caused by water soaking.

Figure 5:
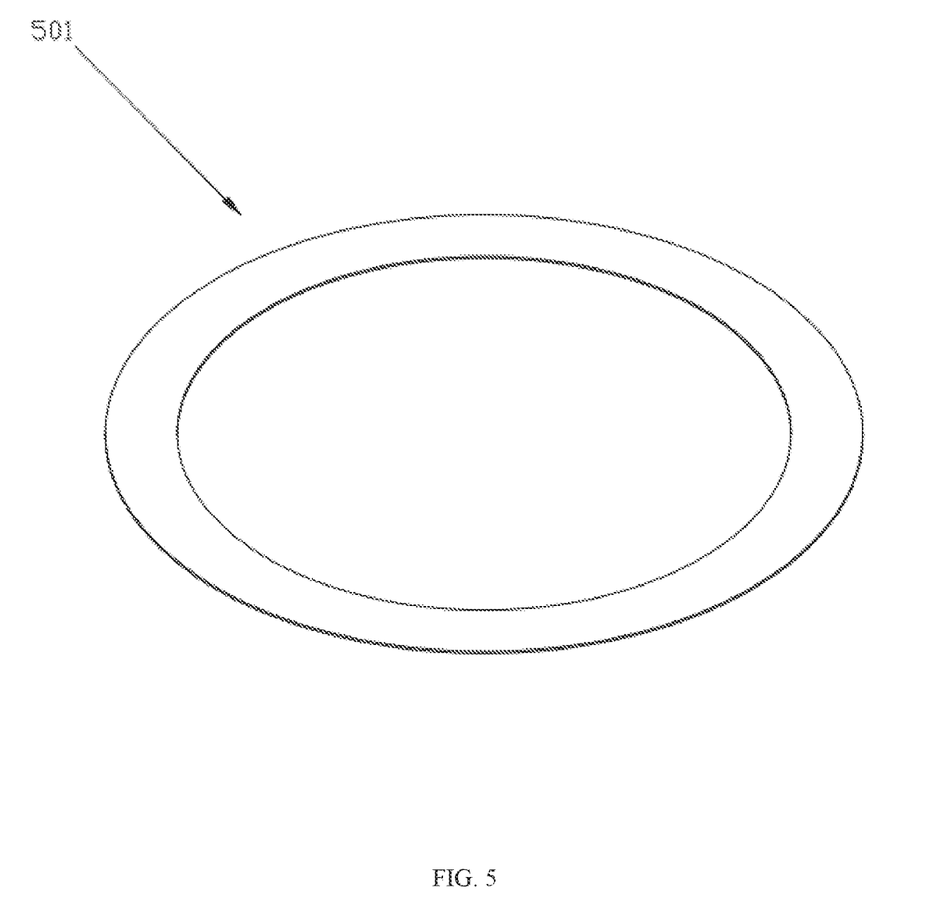
FIG. 5 is a schematic diagram of an insulating ring of the waterproof transformer coil structure according to the embodiments of the disclosure.

With reference to FIG. 1 and FIG. 5, the waterproof transformer coil structure according to the embodiments of the disclosure further includes an insulating ring 501 on both end faces of the winding wire 301, and the insulating ring 501 is made of insulating material. The insulating ring 501 is used for enhancing an insulating performance of the transformer coil.

With reference to FIG. 1, a method for manufacturing the waterproof transformer coil according to the embodiments of the disclosure includes the following steps of: machining an insulating material or an insulating plate into a cylindrical structure to form an insulating cylinder 101; machining an insulating material into struts 201, and machining strip-shaped notches 202 in a middle portion of each of the struts 201; evenly distributing and fixing the struts 201 on a surface of the insulating cylinder 101; and winding the winding wire 301 on the strip-shaped notches 202 of the struts 201 to form a pie winding.

With reference to FIG. 1, the method for manufacturing the waterproof transformer coil according to the embodiments of the disclosure further includes the steps of: inserting an insulating ring 501 on both upper and lower end faces of the pie winding; inserting an angle ring 401 along a bending notch 203 of each of the struts 201; performing primary roasting on the waterproof transformer coil; performing primary vacuum immersion paint on the waterproof transformer coil; performing secondary roasting on the waterproof transformer coil; performing secondary vacuum immersion paint on the waterproof transformer coil; performing third roasting on the waterproof transformer coil; and coating hydrophobic paint on a surface of the waterproof transformer coil.

The embodiments of the disclosure are described in detail with reference to the accompanying drawings above, but the disclosure is not limited to the above embodiments, and various changes may also be made within the knowledge scope of those of ordinary skills in the art without departing from the purpose of the disclosure.

In the description of the disclosure, the descriptions referring to the terms "one embodiment", "some embodiments", "schematic embodiments", "examples", "specific examples", or "some examples" mean that the specific features, structures, materials, or characteristics described in combination with the embodiment or example are included in at least one embodiment or example of the disclosure. In the specification, the schematic representation of the above terms does not necessarily mean the same embodiment or example. Moreover, the specific features, structures, materials or characteristics described may be combined in any one or more embodiments or examples in a suitable manner.

Although the embodiments of the disclosure have been shown and described, those of ordinary skills in the art may understand that various changes, modifications, substitutions and variations may be made to these embodiments without departing from the principle and purpose of the disclosure, and the scope of the disclosure is defined by the claims and their equivalents.

The invention claimed is:

1. A waterproof transformer coil structure, comprising:
   an insulating cylinder configured for supporting a transformer coil;
   a strut configured for being wound with the transformer coil, wherein the strut is mounted on the insulating cylinder, and the strut is provided with strip-shaped notches; and
   a winding wire, wherein the winding wire is wound on the strip-shaped notches,
   wherein two ends of the strut are respectively provided with a bending notch for water drainage, and
   wherein the bending notch comprises an inclined portion for water drainage and a vertical portion, and the inclined portion is connected with the vertical portion.

2. The waterproof transformer coil structure of claim 1, wherein the strut is provided in plural, and the struts are evenly arranged on an outer wall of the insulating cylinder.

3. The waterproof transformer coil structure of claim 1, wherein the strip-shaped notches are evenly arranged on an outer edge of the strut.

4. The waterproof transformer coil structure of claim 1, further comprising an angle ring, wherein an outer end face of the angle ring is lower than an inner end face of the angle ring, and the angle ring is arranged on the bending notch of the strut.

5. The waterproof transformer coil structure of claim 1, wherein the winding wire comprises a metal wire conductor, a first polyimide film, a first insulating paper, a second insulating paper and a second polyimide film; the metal wire conductor, the first polyimide film, the first insulating paper, the second insulating paper and the second polyimide film are wrapped in sequence, and the winding wire is wound on the strip-shaped notches.

6. The waterproof transformer coil structure of claim 1, further comprising an insulating ring arranged on both end faces of the winding wire.

* * * * *